(12) United States Patent
Okamura (10) Patent No.: US 6,870,464 B2
(45) Date of Patent: Mar. 22, 2005

(54) INVENTORY CONTROL SYSTEM (75) Inventor: Eiji Okamura, Tokyo (JP)

(73) Assignee: Leading Information Technology Institute, Inc., Tokyo (JP)

( * ) Notice: Subject to any disclaimer, the term of this patent is extended or adjusted under 35 U.S.C. 154(b) by 264 days.

(21) Appl. No.: 09/746,844

(22) Filed: Dec. 21, 2000

(65) Prior Publication Data

US 2002/0014964 A1 Feb. 7, 2002

(30) Foreign Application Priority Data

Apr. 4, 2000 (JP) ........................................ 2000-102483

(51) Int. Cl.[7] ................................................. H04Q 5/22
(52) U.S. Cl. ............................ 340/10.51; 340/825.49; 340/5.92; 340/10.1; 340/825.36; 340/571; 340/10.42; 340/568.1
(58) Field of Search ............................ 340/10.51, 10.1, 340/572.1, 825.49, 825.36, 5.92, 539.13, 539.32, 571, 10.42, 568.1

(56) References Cited

U.S. PATENT DOCUMENTS 4,412,285 A * 10/1983 Neches et al. .............. 364/200
5,963,134 A * 10/1999 Bowers et al. ........... 340/572.1
6,032,127 A * 2/2000 Schkolnick et al. .......... 705/23
6,362,737 B1 * 3/2002 Rodgers et al. .......... 304/572.1

FOREIGN PATENT DOCUMENTS

JP         08-119419         5/1996

* cited by examiner

Primary Examiner—Michael Horabik
Assistant Examiner—Vernal Brown
(74) Attorney, Agent, or Firm—Fulbright & Jaworski LLP (57) ABSTRACT

The disclosed inventory control system is well suited for many types of small-volume products. A plurality of electronic tags 1 are installed in a floor 3 in which data on installation locations is stored, a storage shelf 8 for storing inventory, and a movable reader 23 that reads location data from the electronic tags 1 and carries a product that moves along the aisle. Data stored in an electronic tag, from among a plurality of electronic tags 3, installed near the storage shelf 8 on which inventory is stored contains data on a product stored on the storage shelf 8. The movable reader 23 comprises a communications antenna 4 that communicates in a wireless fashion with the electronic tags, a transceiver connected to the communications antenna 4, a data processor that sends and receives data via the transceiver, and a database 7 that provides data to the data processor.

13 Claims, 7 Drawing Sheets

INVENTORY CONTROL SYSTEM

FIELD OF THE INVENTION

The present invention relates to an inventory control system for many types of low volume products—such as clothing, accessories, shoes, bags, wallets, and fashion items classified according to design, color, size and the like—that heavily depend on the current fashions and season and change on a short term basis. More particularly, the present invention relates to an inventory control system which uses electronic tags to control the storage location of small quantities of each of many types of products.

BACKGROUND OF THE INVENTION

In controlling product inventory such as clothing, accessories, shoes, bags, wallets, and fashion items, the number of classifications becomes extremely large because each product is segmented by design, color, size and the like.

Further, with respect to products which are highly fashionable and heavily depend on the season, it is necessary to frequently change the inventory because these products should be kept in stock a short period of time.

Therefore, when these inventory products are to be shipped out, one must search and retrieve the desired products from amongst a huge number of inventory classes, and because inventory products are frequently changed, the administration of the storage location data for the inventory products is a major problem.

Figure 9:
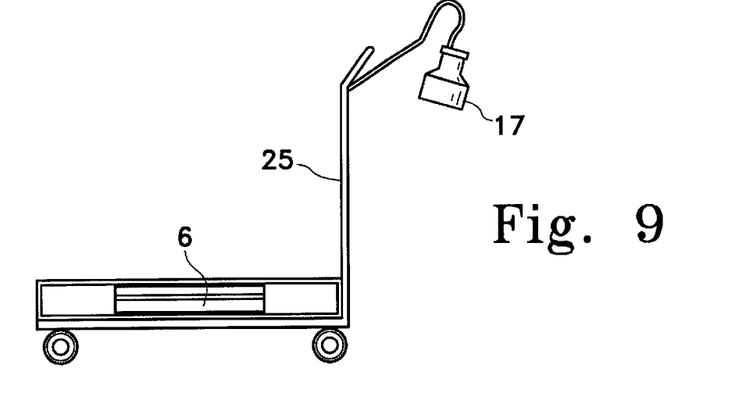
FIG. 9 shows one example of a movable reader used in a conventional inventory control system.

A prior art inventory control system, an example of which is shown in FIG. 9, uses a moveable read-out device 25 comprised of a bar code reader 17 and a data processor 6.

Figure 10:
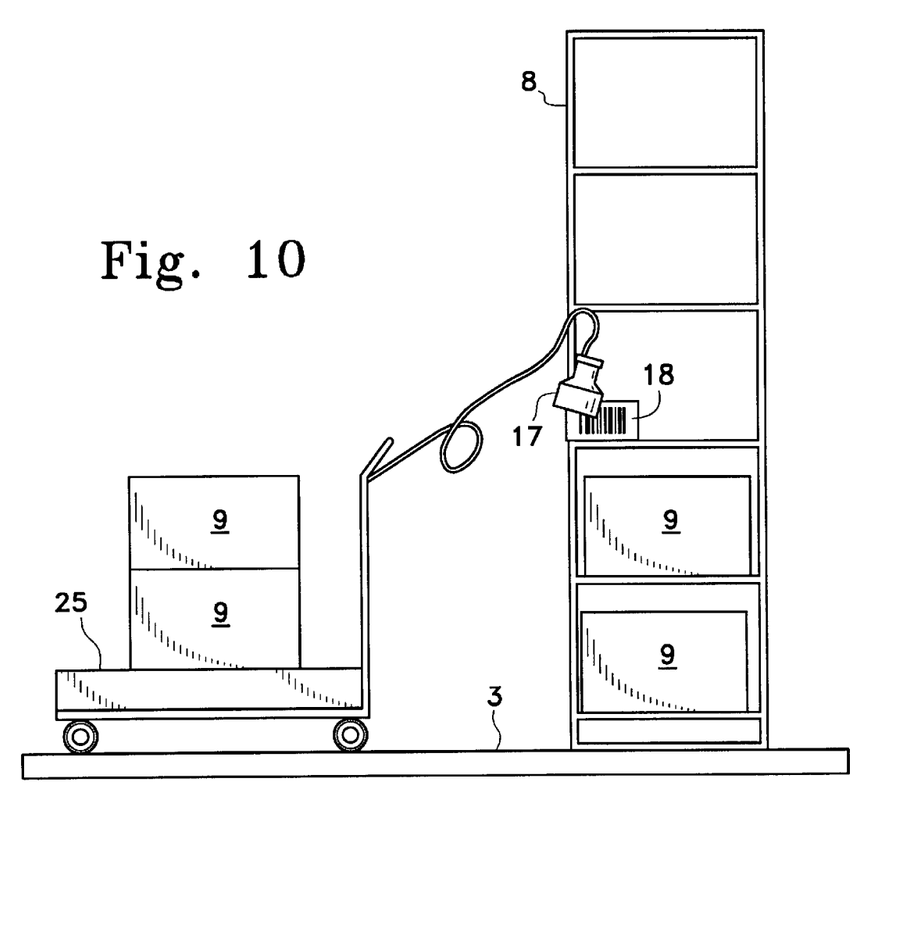
FIG. 10 shows one example of an inventory storage location in a conventional inventory control system.

The prior art inventory control system, as shown in FIG. 10, is further comprised of an inventory storage location having a shelf 8 disposed on a floor 3, a bar code 17 attached to shelf 8, and a plurality of packages 9.

Figure 11:
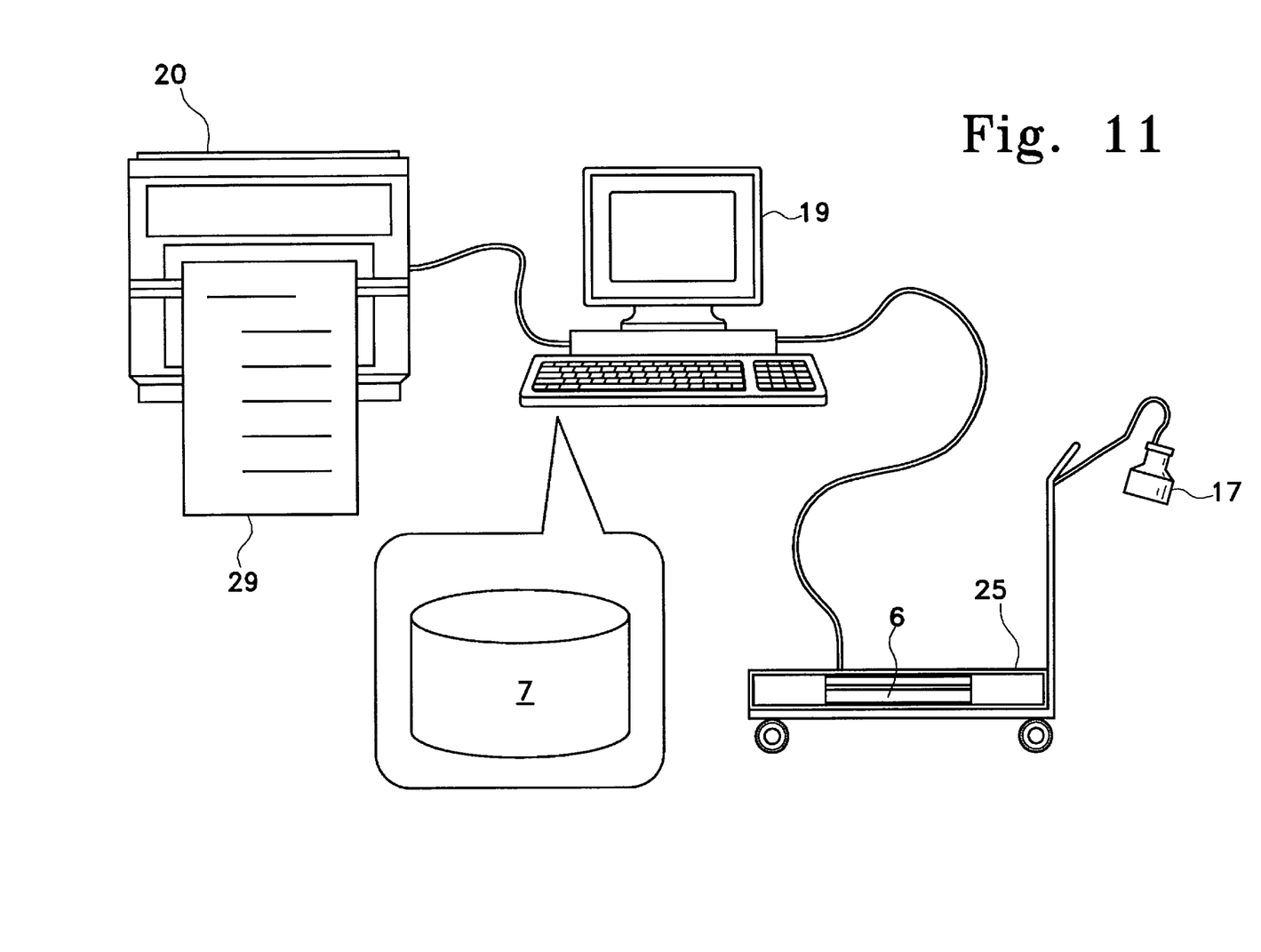
FIG. 11 shows one example of an inventory control center in a conventional inventory control system.

In addition, the prior art inventory control system shown in FIG. 11 is equipped with an inventory control center having a computer 19, a database connected to computer 19 or located therein, and a printer 20 connected to computer 19 for printing out a work order 29.

The moveable read-out device 25 shown in FIG. 9 moves between the inventory storage location and the inventory control center, and operates as transportation device used to bring in and remove inventory products.

When inventory is to be brought in, as shown in FIG. 10, a package 9 containing inventory is loaded on moveable read-out device 25, and is carried to a nearby storage shelf 8.

Next, package 9 is placed on shelf 8, and when it is placed thereon, a worker reads the bar code 18 attached to shelf 8 with bar code reader 17, and data on the storage location is stored in data processor 6.

When all of the inventory in packages 9 have been brought in, the moveable read-out device 25 returns to the inventory control center shown in FIG. 11, the data processor 6 is connected to computer 19, and the storage location data read from bar code 18 on the storage location shown in FIG. 9 is transmitted to computer 19. This data is stored in database 7 and is used for inventory control.

When inventory is to be cleared out, because data on the storage location of inventory products based on the bar code 18 attached to shelf 8 is saved on database 7, computer 19 searches the storage location data, lists the products stored on database 7 that are to be cleared out, and prints out the search results as a work order 29 by means of printer 20.

Therefore, a worker in charge of clearing out these products is able to search for and go to these products by means of work order 29, which contains data on the products to be cleared out and the storage location.

With this sort of prior art inventory control system, when package 9 is placed on shelf 8 or is moved from shelf 8, it is necessary to read bar code 18. With clothing, accessories, shoes, bags, wallets, fashion items, and the like that heavily depend on current fashions and season, the complexity of reading bar code 17 causes work efficiency to decrease because inventory frequently comes in. In addition, with product groups that have a large number of types but a small quantity, a plurality of packages 9 must be frequently moved and arranged on shelf 8 because the content and number of inventory products fluctuate over a short period of time. With this sort of change in storage, for each package 9 to be moved, it is necessary to first read bar code 18 at its current location in order to delete the storage location data, and then read another bar code 18 in order to register the new storage location. This is an extremely tedious task.

Further, in the prior art inventory control system, the task of registering products and the storage location data is necessary. Because all inventory data is stored in database 7, it is necessary to immediately return to the inventory control center after inventory is brought in and store the data read from bar codes 17 in database 7. However, the reading and storage of this data is simply a task which is carried out to control inventory data, and is not undertaken for the task of bringing in inventory, and thus this becomes a burden on inventory control.

A computer 19, a database 7 and a printer 20 are installed in the inventory control center. The inventory control center must be continually used, and its use requires tools, space, staff, and the like. All of this does not have as its object the storage of essential products, and is a burden on the control of inventory data.

When clearing out products, the products to be cleared out and their storage location is printed out on a task sheet 21. However, it is difficult to show a storage location in printed data, and because coordinate data and the like are displayed, workers must guess at the actual storage location. Even if a diagram is provided, it can only be a general overview diagram because it cannot be enlarged or reduced when searching.

BRIEF SUMMARY OF THE INVENTION

An inventory control system according to the present invention is composed of a plurality of electronic tags installed in a path and in which installation location data is stored, a storage means (such as shelving in a warehouse) for storing inventory products, and a moveable reading device which can carry inventory products to be moved along said path and read location data by means of said electronic tags.

Amongst the plurality of electronic tags, the data stored in the electronic tags installed in the vicinity of the storage means for storing inventory products contains data relating to the products stored in the storage means.

The movable reading device includes a communication antenna for wireless communication with the electronic tags, a transceiver connected to the communication antenna, a data processor for sending and receiving data via the transceiver, and a database providing data to the data processor.

The moveable reading device contains a reading device for reading data from product tags attached to products and/or data from package tags attached to packages.

BRIEF DESCRIPTION OF DRAWINGS

The inventory control system of the present invention will be explained with reference to the appended figures, in which.

DETAILED DESCRIPTION OF PREFERRED EMBODIMENT(S)

Figure 1:
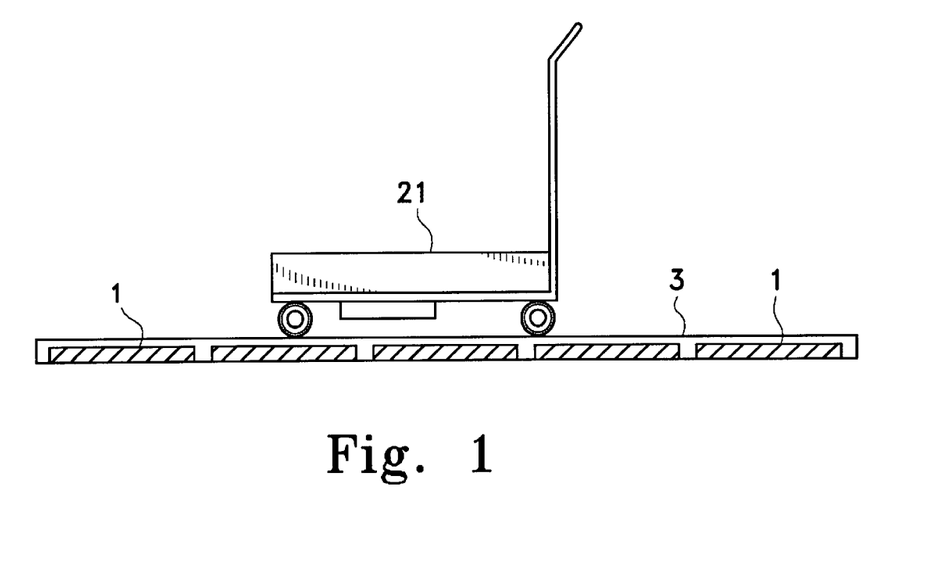
FIG. 1 shows the first embodiment of the movable reader and the floor used in the inventory control system of the invention.

In the inventory control system of the present invention, as shown in FIG. 1, a movable reading device 21 which can carry cargo is used, and moves on floor 3 in which a plurality of electronic tags 1 are embedded. Electronic tags 1 embedded in floor 3 are no-contact type wireless tags which can be read or written to without being contacted. Data on the location of each embedded electronic tag 1 is stored thereon.

Figure 2:
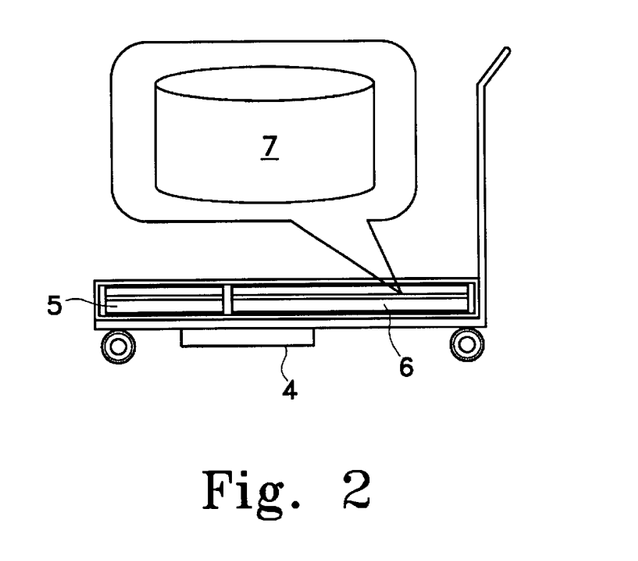
FIG. 2 shows in detail the movable reader seen in FIG. 1.

As shown in FIG. 2, movable reading device 21 is equipped with a communication antenna 4 for wireless communication with electronic tags 1 embedded in floor 3, a transceiver 5 connected to communication antenna 4, a data processor 6 for sending and receiving data via the transceiver 5, and a database 7 installed in data processor 6.

A movable reading device composed in this manner freely moves on floor 3 shown in FIG. 1, but data processor 6 can communicate with electronic tags 1 and exchange data therewith via transceiver 5 and communication antenna 4.

Thus, data processor 6 on movable reading device 21 can read data on its present position at any given moment by means of electronic tags 1.

Figure 3:
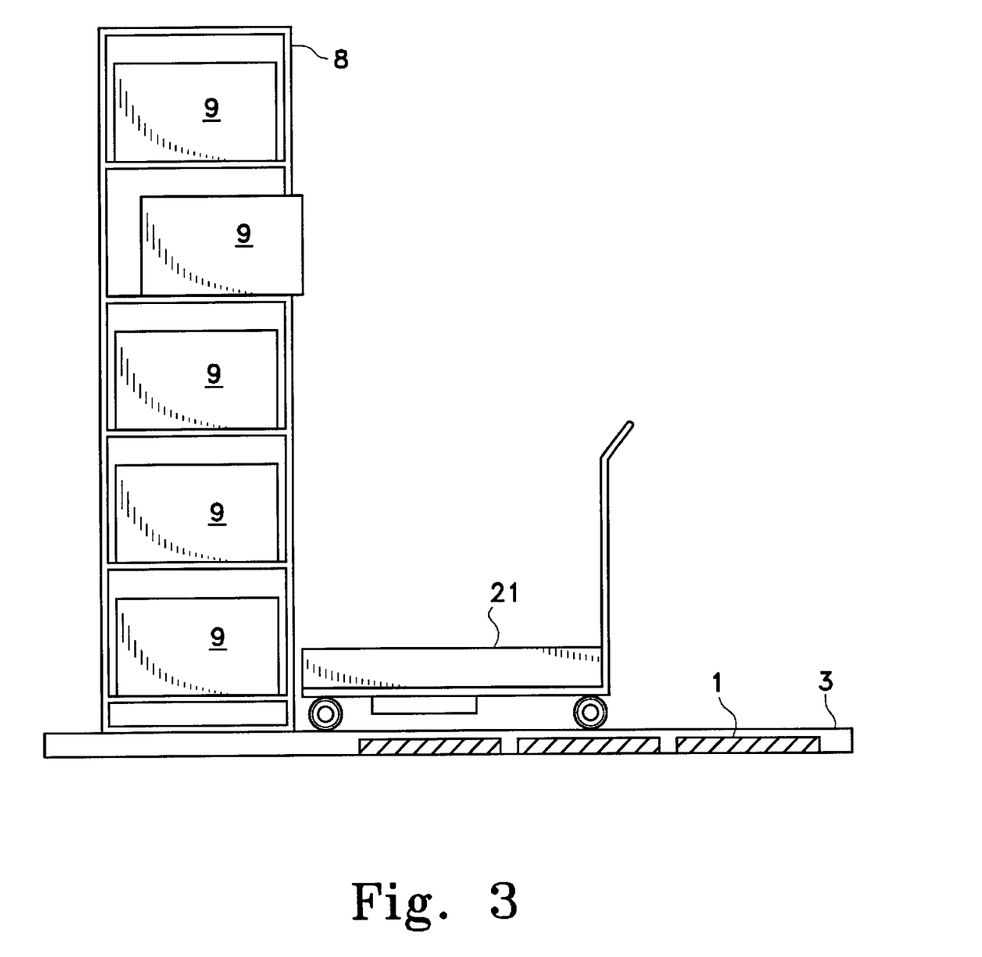
FIG. 3 shows the first embodiment of the inventory control system of the invention.

As shown in FIG. 3, the inventory storage location in which movable reading device 21 goes in and out of is equipped with floor 3 in which a plurality of electronic tags are embedded, and a shelf 8 disposed on floor 3 for supporting packages 9.

Packages 9 are supported by shelf 8, and from amongst the plurality of electronic tags 1, the embedded electronic tag 1 closest to shelf 8 has data stored thereon (other than its installation location data) relating to packages 9 on shelf 8, or data relating to the products stored in packages 9.

In the first embodiment composed in this manner, when movable reading device 21 approaches shelf 8, it can collect data (other than its whereabouts by communication with electronic tags 1) that relates to the packages 9 on shelf 8 or the products in packages 9. This data is used for the task of bringing in or clearing out inventory by means of movable reading device 21. That is, when movable reading device 21 moves on floor 3, data on the inventory products and their storage location will be collected without troubling the workers.

Further, in the first embodiment shown in FIG. 3, data relating to inventory products stored in electronic tags 1 embedded in the vicinity of shelf 8 is transferred from the electronic tags 1 to database 7 installed on movable reading device 21 every time the moveable reading device 21 visits the installed location of the electronic tags 1 in the vicinity of shelf 8.

However, the amount of data that has to be transferred grows large when there is a large volume of stored products, and thus frequent data transfer becomes difficult.

In this sort of situation, when the date and time of the update is added to the data stored on electronic tags 1, it will also be stored on database 7 installed on movable reading device 21 because the data thereon is from electronic tags 1.

Thus, it is possible for data processor 6 to compare the date and time of update stored on database 7 with the latest date and time of update read from electronic tags 1. After this comparison occurs, and it is found that the date and time of update is different, only then is the latest information updated. This makes it possible to reduce the amount of unnecessary communication.

Further, it is acceptable to replace the date and time of update data added to electronic tags 1 with hash values (a reference list) of the stored data.

The hash values compress the original data, and are representative numbers. Statistically, the hash values supply the same value with respect to different data, and are generally independently and individually generated and obtained. This is adequate for the classification of the original data.

Because of this, not all of the former data is transferred and the same results are obtained with the same data (that is, a determination is made as to whether or not there has been an update) and the addition of the date and time of the update. In the first embodiment shown in FIG. 1 and FIG. 3, electronic tags 1 are embedded in floor 3, however they are not limited to the floor, and the same effects and results can be achieved by disposing them on the wall surfaces or storage shelves along the path that the movable reading device travels.

Figure 4:
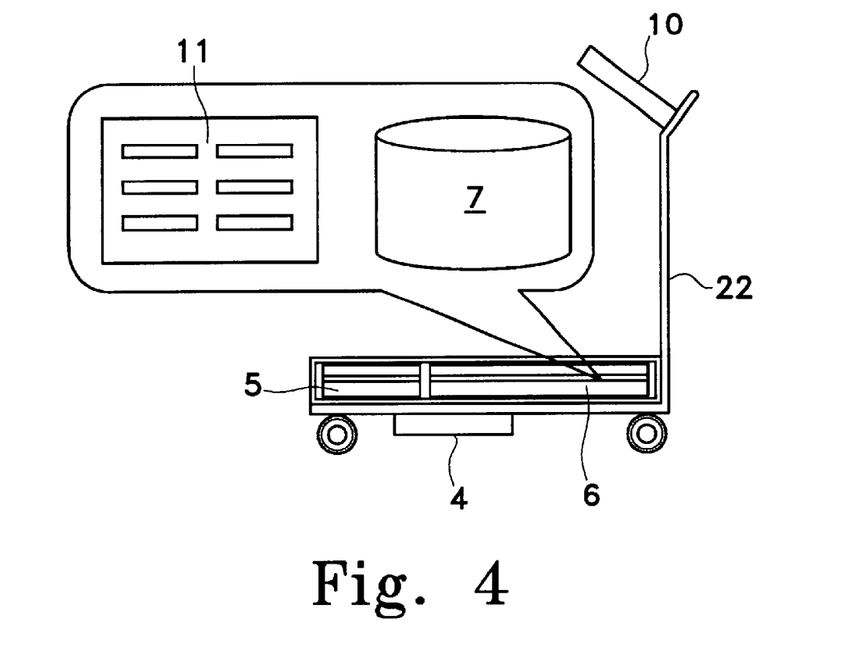
FIG. 4 shows the second embodiment of the movable reader used in the inventory control system of the invention.

As shown in FIG. 4, a moveable reading device 22 used in the second embodiment of the present invention is equipped with a communication antenna 4 for wireless communication with electronic tags 1 embedded in floor 3, a transceiver 5 connected to communication antenna 4, a data processor 6 for sending and receiving data via the transceiver 5, a database 7 installed in data processor 6, map data 11, and a display device 10.

A movable reading device composed in this manner operates in a similar manner as the movable reading device of the first embodiment, and data on inventory products and their storage location are stored together on database 7.

Here, map data 11 includes data based on the storage location data of the inventory products, and if this data is displayed on display device 10, the storage location data of the inventory products can be illustrated.

In addition, if real time position data is obtained from electronic tags 1 embedded in floor 3 by way of communication antenna 4 and transceiver 5, the storage location data of the inventory products can be illustrated.

Further, this position data can be used to enlarge or reduce the display on display device 10. That is, when there are no inventory products around as shown in FIG. 1, and one is primarily moving in that area, then a general map can be displayed. And, when there are inventory products around as shown in FIG. 3 or when one is in a complex area, an enlarged map can be displayed. Thus, it becomes possible to display present position data and highly convenient map data.

Figure 5:
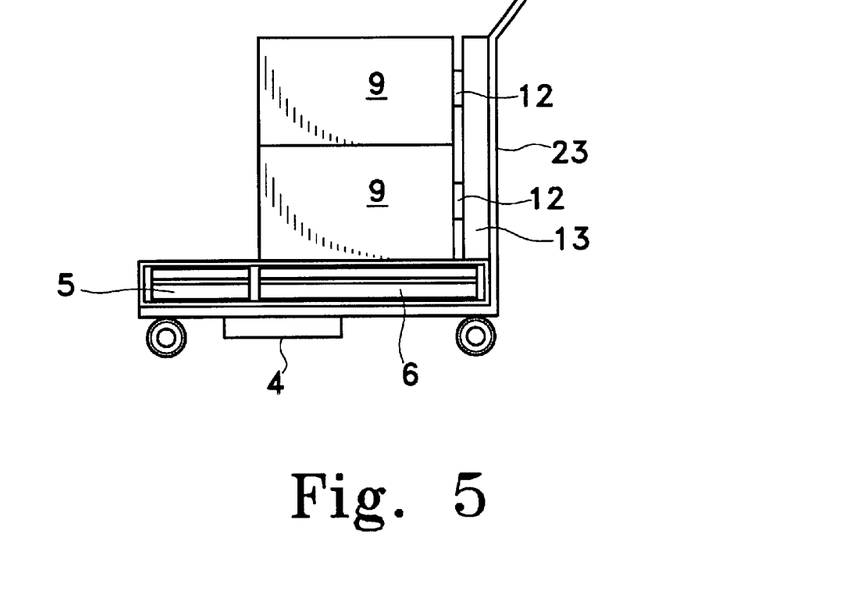
FIG. 5 shows the third embodiment of the movable reader used in the inventory control system of the invention.

As shown in FIG. 5, a moveable reading device 23 used in the third embodiment of the present invention is equipped with a communication antenna 4 for wireless communication with electronic tags 1 embedded in floor 3, a transceiver 5 connected to communication antenna 4, a data processor 6 for sending and receiving data via the transceiver 5, and a reading device 13 for reading data stored in a package tag 12 attached to package 9. Package tag 12 has data stored in it that relates to the package 9 to which it is attached, or data relating to the products stored in package 9.

Figure 6:
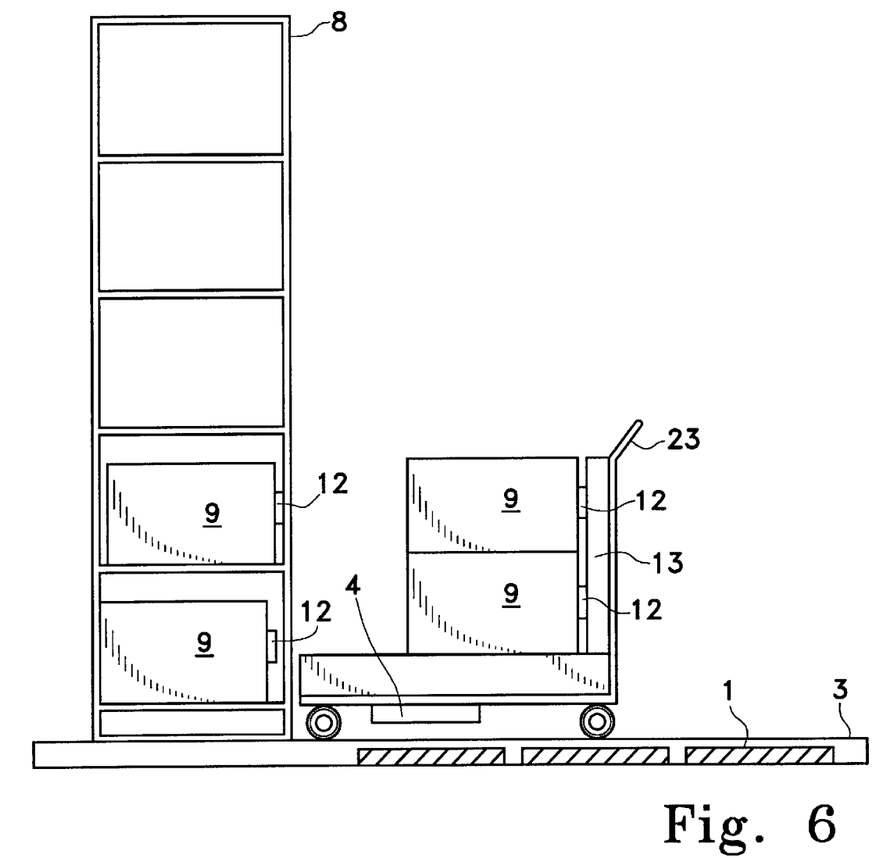
FIG. 6 shows the third embodiment of the inventory control system of the invention.

As shown in FIG. 6, the inventory control system using the movable reading device 23 shown in FIG. 5 is equipped with a moveable reading device 23 that moves freely over the electronic tags 1 embedded in floor 3, and a shelf 8 serving as an inventory storage position that supports a plurality of packages 9 that have package tags 12 attached thereto.

In the third embodiment composed in this manner, by reading the data on package tags 12 attached to packages 9 via reading device 23, the movable reading device 23 can read data relating to the packages 9 supported thereon or data relating to products stored in packages 9.

Accordingly, when inventory comes in, when the movable reading device 23 approaches the vicinity of shelf 8 and a package 9 is placed on shelf 8, the movable reading device 23 can write data relating to the packages 9 supported on shelf 8 or data relating to the products stored in packages 9 to the electronic tags embedded in the vicinity of shelf 8 because the data read from package tag 12 attached to package 9 is transferred to the electronic tags 1 embedded in the vicinity of shelf 8.

When a package 9 is moved from movable reading device 23 to shelf 8, when package 9 has been removed from movable reading device 23 and data from package tag 12 attached to package 9 is no longer being detected, data processor 6 determines that package 9 has been removed and writes data to electronic tags 1 embedded in the vicinity of shelf 8. This allows workers from being bothered with this task, and allows data relating to products disposed on shelf 8 to be added to electronic tags 1.

Further, when package 9 is taken off shelf 8 and placed on movable reading device 23, data processor 6 reads new data via tag reading device 13 from package tag 12 attached to package 9 placed on movable reading device 23, determines that a package 9 has been placed thereon and writes data to electronic tags 1 embedded in the vicinity of shelf 8. This allows workers from being bothered with this task, and allows data relating to products cleared from shelf 8 to be deleted from electronic tags 1.

In this manner, the data stored on electronic tags 1 embedded in the vicinity of shelf 8 is data that is consistent with packages 9 disposed on shelf 8 or the products stored in packages 9.

In this manner, when a package 9 is moved unconsciously by a worker or the movement of package 9 is complex, because movable reading device 23 is interposed therebetween, there is no exceptional burden on workers, and storage location data relating to inventory products can be preserved and updated.

In addition, a read/write device which can add and delete is made by adding writing capabilities to reading device 13, thus allowing package tag 12 to be overwritten. When package 9 is moved, it becomes possible for data processor 6 to write original storage location data onto package tag 12 attached to package 9 via the read/write device, and to record the history of the storage locations of package 9.

Figure 7:
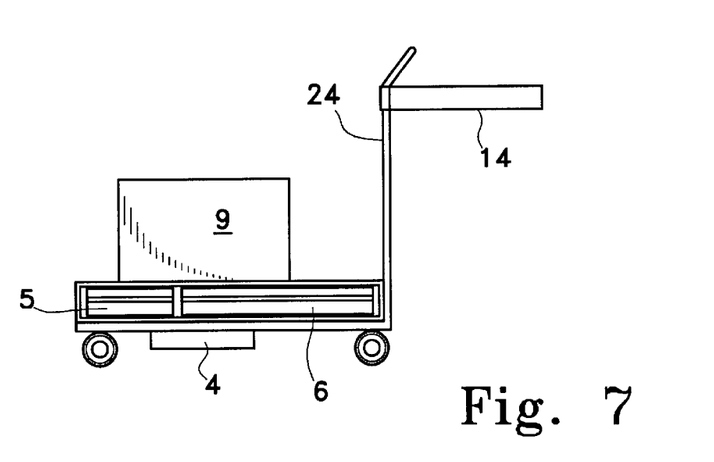
FIG. 7 shows the fourth embodiment of the movable reader used in the inventory control system of the invention.

As shown in FIG. 7, a moveable reading device 24 used in the fourth embodiment of the present invention is equipped with a communication antenna 4 for wireless communication with electronic tags 1 embedded in floor 3, a transceiver 5 connected to communication antenna 4, a data processor 6 for sending and receiving data via the transceiver 5, and a reading device 14 for reading a product tag 15 attached to a product 16.

Figure 8:
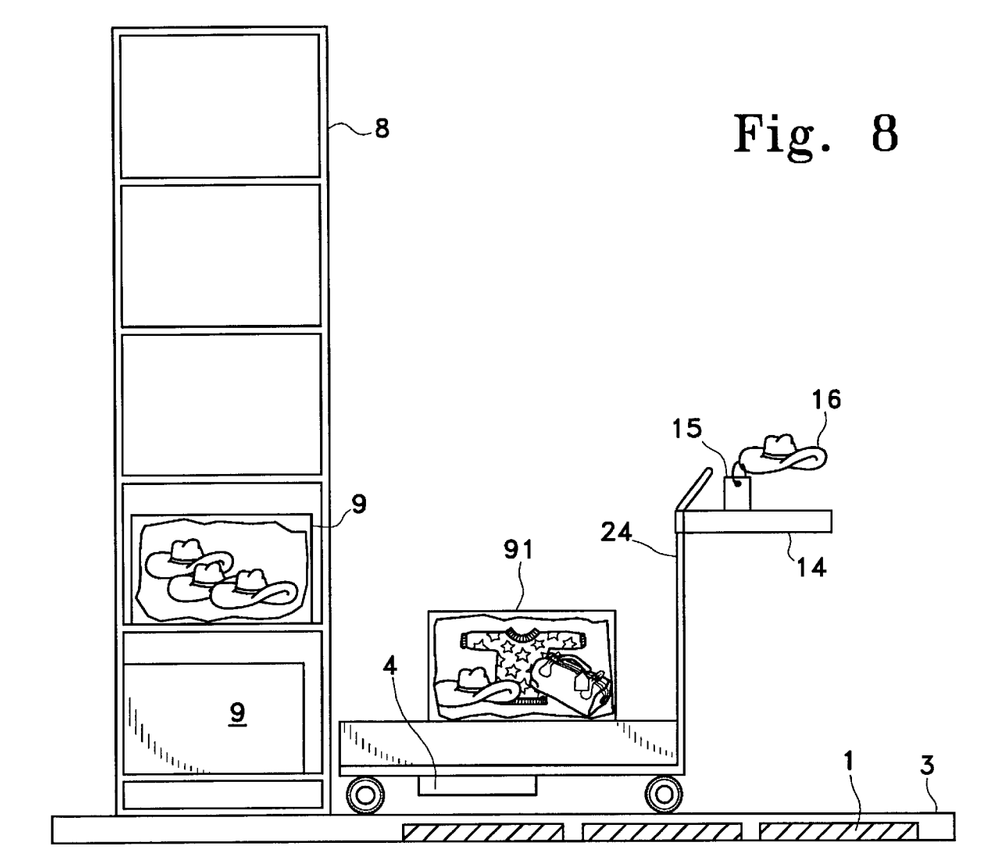
FIG. 8 shows the fourth embodiment of the inventory control system of the invention.

As shown in FIG. 8, the inventory control system using the reading device 24 shown in FIG. 7 is equipped with a moveable reading device 24 that moves freely over the electronic tags 1 embedded in floor 3, and a shelf 8 serving as an inventory storage position that supports a plurality of packages 9.

A product tag 15 is attached to each product 16 stored in the plurality of packages 9.

In addition, data on products 16 placed on shelf 8 is stored on the electronic tags 1 embedded in the vicinity of shelf 8.

With an inventory clearance, when one product 16 stored in package 9 or on shelf 8 is moved to a package 91 prepared beforehand, by placing product 16 close to reading device 14, data processor 6 can obtain data relating to product 16 from product tag 15.

Then, data processor 6 communicates the original data relating to product 16 to the electronic tags 1 embedded in the vicinity of shelf 8 via communication antenna 4, and the data on the total number of products 16 on shelf 8 stored on electronic tags 1 can be reduced by one. In this way, the data stored on the electronic tags 1 embedded in the vicinity of shelf 8 can be controlled in one inventory product unit increments.

In addition, in package 91 in the embodiment, if a package tag 12 similar to that in the third embodiment is attached thereto and a reading device 13 for the package tag is loaded onto movable reading device 24, when product tag 15 is read, both the data stored on electronic tags 1 embedded in the vicinity of shelf 8 and the data on package tag 12 attached to package 91 can be updated. It thus becomes possible to produce detailed data on the products in package 91 due to the package tag 12 attached thereto.

This function is useful in cases where a plurality of different types of products are mixed together and stored in package 91, and is suitable for mixed storage of products such as clothing, shoes, handbags, wallets, and the like, which are the same product according to color, size and the like but have slightly different elements.

As is clear from the above explanation, the third embodiment of the inventory system shown in FIG. 6 is mainly applied to incoming inventory products, and the fourth embodiment of the inventory system shown in FIG. 8 is mainly applied to clearing out inventory products.

Therefore, it is convenient to read the inventory data stored on electronic tags 1 according to the third embodiment of the inventory system with the movable reading device 23 of the fourth embodiment while processing inventory coming in or being cleared out.

As is clear from the explanation based on the above embodiments, the following excellent effects can be obtained according to the present invention:

When a package is placed on a shelf or is moved from a shelf, it is possible for inventory product data and data on the storage location of inventory products to be automatically updated without carrying out a special process;

The task of inputting and outputting data in an inventory control center and the like is unnecessary, a movable reading device is moved to an inventory location, only the task of bringing in or clearing out the actual inventory products is attended to, it is possible to update a database loaded on the movable reading device, and no effort is needed to update this data; and The installation and administration of an inventory control center is unnecessary, and tools, a location, and staff need not be secured.

What is claimed is:

1. An inventory control system comprising:
 a plurality of electronic location tags disposed at respective identified locations along a path, each electronic location tag storing installation location data for a respective said identified location;
 a storage means for storing inventory products of at least some of said identified locations; and
 a transport device which is adapted to carry and move products along said path and read said installation location data from the associated electronic location tags in the vicinity of the transport device to thereby facilitate transfer of the products between the transport device and respective identified locations of the storage means.

2. The inventory control system according to claim 1, wherein the electronic location tag is a no-contact type wireless tag.

3. The inventory control system according to claim 1, wherein data stored on the electronic tag disposed at a particular said location comprises data relating to products stored in said storage means in the vicinity of said location.

4. The inventory control system according to claim 3, wherein data stored on the electronic location tag further comprises the date and time that said stored data was updated.

5. The inventory control system according to claim 4, wherein hash values of said stored data are used as data to represent data stored on the electronic tag.

6. The inventory control system according to claim 1, wherein the transport device includes a communication antenna for wireless communication with the electronic location tag, a transceiver connected to said communication antenna, a data processing device for sending and receiving data via said transceiver; and a database which provides data to said data processing device.

7. The inventory control system according to claim 6, wherein the transport device further includes a reading device for reading data from a package tag attached to a package.

8. The inventory control system according to claim 7, wherein the reading device for reading data from the package tag attached to the package is furnished with a writing function.

9. The inventory control system according to claim 6, wherein the transport device further includes a reading device for reading data from a product tag attached to a product.

10. The inventory control system according to claim 9, wherein said product is at least clothing, shoes a handbag, a wallet or a fashion item.

11. The inventory control system according to claim 6, wherein a display device is provided on the transport device, the electronic location tag further includes installation location map data, and said display device displays a map.

12. The inventory control system according to claim 6, wherein the transport device includes update day and time data and/or representative data stored on the electronic tag, update day and time data and/or representative data saved on its database, and a comparison means for comparing the data stored on the tag with the data stored in the database.

13. The inventory control system according to claim 1, wherein the electronic location tag is disposed on the floor of a building, a wall surface, or a storage shelf.

* * * * *